United States Patent [19]

Smith et al.

[11] Patent Number: 5,096,993

[45] Date of Patent: Mar. 17, 1992

[54] THERMOPLASTIC POLYURETHANE ELASTOMERS AND POLYUREA ELASTOMERS MADE USING LOW UNSATURATION LEVEL POLYOLS PREPARED WITH DOUBLE METAL CYANIDE CATALYSTS

[75] Inventors: Curtis P. Smith, Cheshire; Maurice C. Raes, Branford; John W. Reisch, Guilford; Kiran B. Chandalia, Cheshire; James M. O'Connor, Branford, all of Conn.

[73] Assignee: Olin Corporation, Cheshire, Conn.

[21] Appl. No.: 608,517

[22] Filed: Nov. 2, 1990

[51] Int. Cl.$^5$ ............................................. C08G 18/22
[52] U.S. Cl. ...................................... 528/61; 528/64; 528/65; 528/66; 528/76
[58] Field of Search ......................... 528/61, 64, 65, 66, 528/76

[56] References Cited

U.S. PATENT DOCUMENTS

| | | | |
|---|---|---|---|
| 3,829,505 | 9/1974 | Herold et al. | 260/611 B |
| 4,202,957 | 5/1990 | Bonk et al. | 528/77 |
| 4,242,490 | 12/1980 | Emerson et al. | 528/77 |
| 4,376,834 | 3/1983 | Goldwasser et al. | 528/60 |

*Primary Examiner*—Maurice J. Welsh
*Attorney, Agent, or Firm*—Dale Lynn Carlson

[57] ABSTRACT

This invention relates to a method of fabricating a thermoplastic elastomer which comprises the steps of: (a) fabricating a polyol having a molecular weight of between about 2,000 and about 20,000 and having a level of end group unsaturation of no greater than 0.04 milliequivalents per gram of polyol, said polyol being fabricated in the presence of a double metal cyanide catalyst, (b) reacting said polyol with a diisocyanate to produce an isocyanate-terminated prepolymer, and (c) reacting said isocyanate-terminated prepolymer with a difunctional isocyanato-reactive chain extender in a mold or in an extruder in order to produce a soft elastomer characterized by a Shore A hardness of between about 10 and about 70. Also claimed is the elastomer produced by the above method utilizing a one-shot technique.

20 Claims, No Drawings

THERMOPLASTIC POLYURETHANE ELASTOMERS AND POLYUREA ELASTOMERS MADE USING LOW UNSATURATION LEVEL POLYOLS PREPARED WITH DOUBLE METAL CYANIDE CATALYSTS

FIELD OF THE INVENTION

The present invention relates generally to the production of thermoplastic polyurethane ("TPU") elastomers and polyurea elastomers and, more specifically, to the production of soft elastomers utilizing low unsaturation level polyols prepared by double metal cyanide complex catalysis.

BACKGROUND OF THE INVENTION

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Certain thermoset polyurethane elastomers produced using triols made by DMC catalysis are also known. More specifically, U.S. Pat. No. 4,242,490 discloses the preparation of such elastomers by reacting a DMC catalyst-prepared polypropylene ether triol having a molecular weight of from 7,000 to 14,000, ethylene glycol, and toluene diisocyanate in a specified range of molar ratios using either a prepolymer process or a "one-shot" process.

Methodology for preparing TPU elastomers is well-established in the art. By way of illustration, U.S. Pat. No. 4,202,957 discloses polyurethane polyether-based elastomers, made using a select group of polypropylene oxide-Polyethylene oxide block copolymers, which this patent states are thermoplastic, recyclable and possess high temperature degradation resistance thus permitting fabrication by injection molding. Unfortunately, the TPU elastomers prepared in accordance with prior art methods, such as that disclosed in U.S. Pat. No. 4,202,957, are generally not as soft as might be desired.

Heretofore, the use of high molecular weight polyols made with double metal cyanide catalysts in combination with chain extenders in the preparation of thermoplastic elastomers, particularly thermoplastic elastomers characterized by enhanced softness, has not been known based upon the knowledge of the present inventor The discovery of such soft elastomers would be highly desired by the elastomer manufacturing community.

SUMMARY OF THE INVENTION

In one aspect, the present invention relates to a thermoplastic polyurethane or polyurea elastomer made by reacting in a "one-shot" process (preferably a continuous one-shot process) a polyether polyol, a diisocyanate, and a difunctional, isocyanato-reactive chain-extender, the polyether polyol being prepared utilizing a double metal cyanide complex catalyst and having a molecular weight of between about 2000 and about 20,000 (advantageously between 2,000 and 10,000, more advantageously between 4,000 and 10,000), said polyol having an end group unsaturation level of no greater than 0.04 milliequivalents per gram of polyol, the equivalent ratio of NCO groups on said diisocyanate to active hydrogen groups on said polyol plus chain extender being between about 1:0.7 and about 1:1.3 (preferably between 1:0.9 and 0.9:1, more preferably between 1:0.95 and 0.95:1), and the molar ratio of chain extender to polyol being between about 0.15:1 and about 75:1.

In another aspect, the present invention relates to a thermoplastic polyurethane or polyurea elastomer made by reacting an isocyanate-terminated prepolymer with a difunctional isocyanato-reactive chain-extender, the isocyanate-terminated Prepolymer being the reaction product of a polyisocyanate and a polyether polyol prepared utilizing a double metal cyanide complex catalyst and having a molecular weight of between about 2000 and about 20,000 (advantageously between 2,000 and 10,000, more advantageously between 4,000 and 10,000), said polyol having an end group unsaturation level of no greater than 0.04 milliequivalents per gram of polyol, the equivalent ratio of NCO groups on said diisocyanate to active hydrogen groups on said polyol plus chain extender being between about 1:0.7 and about 1:1.3 (preferably between 1:0.9 and 0.9:1, more preferably between 1:0.95 and 0.95:1), and the molar ratio of chain extender to polyol being between about 0.15:1 and about 75 1.

In yet another aspect, the present invention relates to a method of fabricating a thermoplastic elastomer which comprises the steps of:
  (a) fabricating a polyol having a molecular weight of between about 2,000 and about 20,000 (advantageously between 4,000 and 12,000) and having a level of end group unsaturation of no greater than 0.04 milliequivalents per gram of polyol, said polyol being fabricated in the presence of a double metal cyanide catalyst,
  (b) reacting said polyol with a diisocyanate to produce an isocyanate-terminated prepolymer, and
  (c) reacting said isocyanate-terminated prepolymer with a difunctional isocyanato-reactive chain extender in a mold or in an extruder in order to produce a soft elastomer characterized by a Shore A hardness of between about 10 and about 70, advantageously between about 40 and about 60, with the proviso that when the molecular weight of the polyol is less than 4,000, then the polyol has an ethylene oxide content of less than 35 weight based upon the weight of the polyol.

These and other aspects will become apparent upon reading the following detailed description of the invention.

DETAILED DESCRIPTION OF THE INVENTION

It has now been surprisingly found in accordance with the present invention that soft thermoplastic elastomers having a Shore A hardness in the range of between about 10 and about 70, advantageously between about 40 and about 60 are produced utilizing polyols made with double metal cyanide complex catalysts. These soft elastomers exhibit excellent physical and chemical properties. The elastomers possess the hydrolytic stability commonly exhibited by polyether-based polyurethanes as well as excellent structural strength and stability characteristics. In addition, the elastomers are recyclable and can be remolded.

The thermoplastic elastomers of the present invention may be made by the prepolymer process or the one-shot process. The polyurethane isocyanate-terminated prepolymer that is utilized when employing the prepolymer process according to the invention is prepared by reacting an organic polyisocyanate with a polyalkylene ether polyol(s) in an equivalent ratio of NCO to OH groups of from about 15:1 and about 1.2:1 (preferably between 7:1 and 3:1), using standard procedures, to yield an isocyanate-terminated prepolymer of controlled molecular weight. The reaction may be accelerated by employing a catalyst; common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 2 percent by weight of the polyurethane prepolymer.

Preferred polyol reactants are the polyether diols and combinations thereof. Suitable polyether diols include various polyoxyalkylene diols and combinations thereof preferably containing ethylene oxide ("EO") in an amount of between about 5 and about 40, more preferably between about 15 and about 30, weight percent based upon the weight of the polyol. Suitable diols preferably have a primary hydroxyl content of between about 30 and about 95%, more preferably between about 50 and about 95%. The ethylenic unsaturation level for the polyol is preferably no greater than 0.04, more preferably less than 0.025, milliequivalents per gram of polyol. It is preferred that any residual alkali metal catalyst in the polyol be no greater than 25 ppm, more preferably no greater than 8 ppm, most preferably no greater than 5 ppm. The potential adverse effects of residual alkali metal catalyst in the polyol can be overcome by neutralizing with an effective amount of an acid, such as phosphoric acid.

The polyols can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether diol reactant includes the following and mixtures thereof: ethylene glycol, diethylene glycol, propylene glycol, dipropylene glycol, butylene glycol, butane diols, pentane diols, water, combinations thereof, and the like.

The alkylene oxide-polyhydric initiator condensation reaction is preferably carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis, the unsaturation formed increases as a direct function of equivalent weight. Eventually conditions are established wherein further propylene oxide addition fails to increase the molecular weight. In other words, the use of alkali catalysts to produce high molecular weight, hydroxy terminated polyoxypropylene ethers results in a substantial loss in hydroxy functionality. With double metal cyanide catalysis, much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849; 4,242,490 and 4,335,188 to The General Tire & Rubber Company. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z may be fractional numbers, integers, or zero and vary depending on the exact method of preparation of the complex.

Any suitable organic diisocyanate, or mixture of diisocyanates, may be used in the elastomer-forming process of the present invention. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), dibenzyl diisocyanate, xylene diisocyanate (XDI), isophorone diisocyanate (IPDI), 3,3'-bistoluene-4,4'-diisocyanate, hexamethylene diisocyanate (HDI), hydrogenated MDI, hydrogenated XDI, cyclohexane diisocyanate, paraphenylene diisocyanate, mixtures and derivatives thereof, and the like. Other advantageous embodiments of the invention suitably employ an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI.

Chain extenders useful in the present invention include diols and diamines such as ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, or polyalkylene oxide diols with molecular weights between 100–500, diethyltoluene diamine, ethylene diamine, 4,4'-methylene bis(2-chloroaniline) ("MOCA"), hydrazine, substituted aromatic diamines such as the product commercially available as UNILINK 4200, a product of UOP, Inc, N,N-bis(2-hydroxypropyl)-aniline which is commercially available as ISONOL 100, a product of Dow Chemical Corp., and the like, and combinations thereof. The chain extension can be conducted either in situ during the prepolymer formation or in a separate reaction step.

In preparing the polyurethane and/or polyurea elastomer, the polyether polyol(s), polyisocyanate(s), chain extender(s), and other components are reacted, typically under conditions of an elevated temperature. A preferred method of forming the desired thermoplastic elastomers is by continuous processing utilizing an extruder as illustrated by U.S. Pat. No. 3,642,964, incorporated herein by reference in its entirety. An alternative method involves batch processing, followed by grinding and extrusion of the formed elastomer as is well-known in the art. Although either the prepolymer method or the one-shot method can be used, the one-shot method is preferred. The one-shot method is intended to also include the process whereby the diisocyanate has been converted to a quasi-prepolymer by reaction with a minor amount (i.e., less than about 10 percent on an equivalent basis) of polyol prior to carrying out the polyurethane forming reaction.

In preparing the elastomer, urethane forming catalysts can be used as well as the usual compounding ingredients such as antioxidants or other antidegradants. Typical antioxidants include hindered phenols, butylated hydroxytoluene ("BHT"), and the like. Other optional compounding ingredients include, for example, plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the elastomer in an amount of between 0 and about 75 weight percent based upon the weight of the elastomer. The polymerization reaction may be carried out in a single reaction (one-shot process), or in one or more sequential steps (prepolymer process), using either bulk polymerization or solution polymerization. When solution polymerization is used, polar solvents such as tetrahydrofuran ("THF"), dimethylformamide ("DMF"), and dimethylacetamide ("DMAC") are typically utilized. In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea elastomer. However, the order of mixing is not critical as long as the components do not undesirably react before all components are present. The reaction mixture is usually then placed in a mold, or extruded through an extruder, and cured at a suitable temperature. The apparatus used for blending and molding is not especially critical. Hand mixing, conventional machine mixing, and the so-called reaction injection molding (RIM) equipment are all suitable. In the prepolymer process, all or a portion of one or more of the isocyanate reactive materials is reacted with a stoichiometric excess of the polyisocyanate to form an isocyanate-terminated prepolymer. This Prepolymer is then allowed to react with the remaining isocyanate-reactive materials to prepare the polyurethane and/or polyurea elastomer. The prepolymer can be prepared with either the polyether or the chain extender, or a mixture of both.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air, water, or other gases before the reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C. to about 115° C. The time required for curing will vary the temperature of curing and also with the nature of the particular composition, as is known in the art.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

SPECIFIC EXAMPLES

I. PREPARATION OF HIGH MOLECULAR WEIGHT POLYOL WITH LOW UNSATURATION

A 2 gallon autoclave was filled with 550 g. of Poly-G ® 20-112, a polyoxypropylene diol of molecular weight 1000, and 2.2 g. of a double metal cyanide catalyst. The catalyst is a Zinc Cobaltihexacyanate complex with 1,2-dimethoxyethane (glyme). The reactor was closed, flushed three times with nitrogen and then heated to 100° C. At that time a total of 150 g. propylene oxide was added and after 20 min. the reaction started, as evidenced by a pressure drop. Then propylene oxide, 3850 g. was added over a period of 4 hrs at a propylene oxide partial pressure of 30 psi.

When the pressure dropped to 10 psi. KOH, 16 g., was introduced into the reactor and then ethylene oxide, 680 g., was reacted at 70 psi for 5 hrs. The unreacted ethylene oxide was vented and the reactor cooled and opened up. To the reactor was added magnesium silicate, 100 g., and Supercell filter aid, 100 g.. The contents of the autoclave were then heated to 100° C. for 2 hrs., after which time a vacuum of 25" water was applied for 1 hr. The Polyol was then pushed through a small preheated filter press, containing a 5 micron paper filter, at 40 psi. and 100° C. Analysis showed that the polyol contained 9% ethylene oxide, had an OH # of 16 mg KOH/g. and had 70% primary OH. The unsaturation value was 0.0175 meq/g. and the Zn, Co and K contents were the physical properties of the polyols used is given in Table I.

II. PREPARATION OF A THERMOPLASTIC POLYURETHANE FROM A LOW UNSATURATION CONTAINING HIGH MOLECULAR WEIGHT POLYOL (OH#28.3, MW 3965)

In a preparation similar to 1. above a polyol was prepared where analysis showed that the material contained 23% ethylene oxide and had an OH # of 28.3 mg KOH/g. The unsaturation value was 0.015 meq/g. and the residual KOH was 2.66 ppm.

A 2000 ml resin flask was charged with 1106.33 g., 0.2790 moles, of the polyol. The polyol was treated with 1.036 g. of a 0.5 wt % 85% $H_3PO_4$ solution in PG 55–56, a 2000 MW polyol. In addition 0.55 g., 0.05 wt% of triphenyl phosphite was added and the mixture vacuum dried at 110° C. and 0.2mm of Hg for two hours.

A 2000 ml resin flask was charged with 900 g., 0.227 moles, of the above KOH adjusted polyol. In addition, 1,4-butanediol, 63.33 g., 0.703 mole, and less than 1 wt % of a mixture of phenolic antioxidant, amide mold release and other processing aids were added. The mixture was dehydrated at 85° C. in vacuo, 1–2 mm Hg, for two hours after which time period 300 g. increments were weighed out and placed in a 90° C. oven prior to mixing with the appropriate isocyanate.

A. Diphenylmethane diisocyanate

Diphenylmethane diisocyanate, MDI, 73.88 g., 0.295 mole, was weighed out and maintained at 90° C. prior to mixing. To prepare the thermoplastic polyurethane stannous octoate, 0.053 g., was added to the polyol and mixed. The MDI was then added and the mixture rapidly stirred until it thickens (15–20 sec) at which point it is then poured into a Teflon ® coated pan and allowed to cure. After curing the elastomer is granulated, dried at 100° C. and 0.3 mm Hg for 14–18 hrs. The dried polymer is melt processed on a ¾" single screw extruder at 33 rpm and melt profile 183–194° C. The extrudate is granulated, dried at 100° C. and 0.3 mm Hg for 14–18 hrs. and compression molded at 390° F. Specimens for tensile, die C and split tear were die cut from the molded plaques after standing 5 days at ambient temperature.

An elastomer of 69 Shore A hardness and 2375 psi tensile strength is obtained. Compare with example IIIA and IIIB in Table 2 where 59–62 Shore A hardness and 480–700 psi tensile strength is obtained from TPUs made with conventional polyols. These improved properties clearly demonstrate the benefits of low unsaturation containing polyols.

Test results: See IIA. in Table 2

B. Methylene bis(4-cyclohexylisocyanate)

A 1000 ml resin flask was charged with 551.5 g., 0.139 moles, of the polyol. In addition, 1,4-butanediol, 37.56g., 0.417 mole, and less than 1 wt % of a mixture of phenolic antioxidant, amide mold release and other processing aids were added. The mixture was dehydrated at 85° C. in vacuo, 1–2 mm Hg, for two hours after which time period 277.4g. and 304.9 g. increments were weighed out and placed in a 90° C. oven prior to mixing with the appropriate isocyanate.

Methylene bis(4-cyclohexylisocyanate), $H_{12}$MDI, 68.83 g., 0.262 mole, and 75.66 g., 0.288 mole was weighed out and maintained at 90° C. prior to mixing. To prepare the thermoplastic polyurethane stannous octoate, 0.224–0.252 g., was added to the polyol and mixed. The $H_{12}$MDI was then added and the mixture rapidly stirred until it thickens (25–40 sec) at which point it is then poured into a Teflon ® coated pan and allowed to cure. After curing the elastomer is granulated, dried at 100° C. and 0.3 mm Hg for 14–18 hrs. The dried polymer is melt processed on a ¾" single screw extruder at 31 rpm and melt profile 165–181° C. The extrudate is granulated, dried at 100° C. and 0.3 mm Hg for 14–18 hrs. and compression molded at 380° F. Specimens for tensile, die C and split tear were die cut from the molded plaques after standing 5 days at ambient temperature.

An elastomer of 66 Shore A hardness and 1146 psi tensile strength is obtained. Compare with example IIIC in Table 2 where 65 Shore A hardness and 715 psi tensile strength is obtained from a TPU made with a conventional polyol Again, the benefits of low unsaturation in the polyol is clearly demonstrated.

Test results: See IIB in Table 2

III. COMPARISON EXAMPLES - PREPARATION OF A THERMOPLASTIC POLYURETHANE FROM A CONVENTIONALLY PREPARED POLYOL (OH# 27.7, MW 4050, UNSATURATION 0.0615 meo/g Residual KOH 7.76 ppm)

A 2000 ml resin flask was charged with 1075.1 g., 0.2654 moles, of the polyol. In addition, 1,4-butanediol, 71.66 g., 0.7963 mole, and less than 1 wt % of a mixture of phenolic antioxidant, amide mold release, triphenyl phosphite were added. The mixture was dehydrated at 90° C. in vacuo, 1–2 mm Hg, for two hours after which time period 200 g. increments were weighed out and Placed in a 90° C. oven prior to mixing with the isocyanate.

A. Diphenylmethane diisocyanate

1. Without KOH adjustment

Diphenylmethane diisocyanate, MDI, 47.40 g., 0.1892 mole, increments were weighed out and maintained at 90° C. prior to mixing. To prepare the thermoplastic polyurethane stannous octoate, 0.012–0.026 g. were added to the polyol samples and mixed. The MDI was then added and the mixture rapidly stirred until it thickens (10–17 sec) at which point it is then poured into a Teflon ® coated pan and allowed to cure. After curing the elastomer is granulated, dried at 100° C. and 0.3 mm Hg for 14–18 hrs. The dried polymer is melt processed on a ¾" single screw extruder at 28 rpm and melt profile 175–196° C. The extrudate is granulated, dried at 100° C. and 0.3 mm Hg for 14–18 hrs. and compression molded at 380° F. Specimens for tensile, die C and split tear were die cut from the molded plaques after standing 5 days at ambient temperature.

An elastomer of 59 Shore A hardness and 512 psi tensile strength is obtained. Compared to IIA the elastomers have inferior properties.

Test results: See IIIA in Table 2.

2. With KOH adjustment

A 2000 ml resin flask was charged with 1330.3 g., 0.3284 moles, of the polyol. The polyol was treated with 3.863 g. of a 0.5 wt % 85% $H_3PO_4$ solution in PG 55–56, a 2000 MW polyol. In addition 0.70 g., 0.05 wt % of triphenyl phosphite was added and the mixture vacuum dried at 110° C. and 1–2mm of Hg for two-three hours.

A 2000 ml resin flask was charged with 900.0 g., 0.222 moles, of the polyol. In addition, 1,4-butanediol, 63.25 g., 0.702 mole, and less than 1 wt % of a mixture of phenolic antioxidant, ester mold release, triphenyl phosphite were added. The mixture was dehydrated at 85° C. in vacuo, 1–2 mm Hg, for two hours after which time period 300 g. increments were weighed out and placed in a 90° C. oven prior to mixing with the isocyanate.

Diphenylmethane diisocyanate, MDI, 73.45 g., 0.0.294 mole, increments were weighed out and maintained at 90° C. prior to mixing. To prepare the thermoplastic polyurethane stannous octoate, 0.080 g. were added to the polyol samples and mixed. The MDI was then added and the mixture rapidly stirred until it thickens (6–10 sec) at which point it is then poured into a Teflon ® coated pan and allowed to cure. After curing the elastomer is granulated, dried at 100° C. and 0.3 mm Hg for 14-18 hrs. The dried polymer is melt processed on a ¾" single screw extruder at 30 rpm and melt profile 175-199° C. The extrudate is granulated, dried at 100° C. and 0.3 mm Hg for 14-18 hrs. and compression molded at 380° F. Specimens for tensile, die C and split tear were die cut from the molded plaques after standing 5 days at ambient temperature.

An elastomer of 62 Shore A hardness and 691 psi tensile strength is obtained. This example demonstrates the beneficial use of KOH adjusted conventional polyol versus an unadjusted one, although the effect is marginal due to the high unsaturation level.

Test results: See IIIB. in Table 2.

B. Methylene bis(4-cyclohexylisocyanate

A 2000 ml resin flask was charged with 1075.1 g., 0.2654 moles, of the polyol. In addition, 1,4-butanediol, 71.66 g., 0.7963 mole, and less than 1 wt % of a mixture of phenolic antioxidant, amide mold release, triphenyl phosphite were added. The mixture was dehydrated at 90° C. in vacuo, 1-2 mm Hg, for two hours after which time period 200 g. increments were weighed out and placed in a 90° C. oven prior to mixing with the isocyanate.

Methylene bis(4-cyclohexylisocyanate), $H_{12}$MDI, 48.61 g., 0.1855 mole, increments were weighed out and maintained at 90° C. prior to mixing. To prepare the thermoplastic polyurethane stannous octoate, 0.084-0.168 g., was added to the polyol and mixed. The $H_{12}$MDI was then added and the mixture rapidly stirred until it thickens (15-20 sec) at which point it is then poured into a Teflon ® coated pan and allowed to cure. After curing the elastomer is granulated, dried at 100° C. and 0.3 mm Hg for 14-18 hrs. The dried polymer is melt processed on a ¾" single screw extruder at 34 rpm and melt profile 145-148° C. The extrudate is granulated, dried at 100° C. and 0.3 mm Hg for 14-18 hrs. and compression molded at 300° F. Specimens for tensile, die C and split tear were die cut from the molded plaques after standing 5 days at ambient temperature.

An elastomer of 65 Shore A hardness and 715 psi tensile strength is obtained. Again, the high unsaturation containing polyol gives an inferior polymer.

Test results: See IIIC in Table 2.

IV. PREPARATION OF A SOFT THERMOPLASTIC POLYURETHANE FROM A LOW UNSATURATION CONTAINING HIGH MOLECULAR WEIGHT POLYOL (OH# 16, MW 7012)

A 1000 ml resin flask was charged with 794.44 g, 0.1133 moles, of the polyol made in Example 1. In addition, 1,4-butanediol, 34.68 g., 0.3853 mole, and less than 1 wt % of a mixture of phenolic antioxidant, amide mold release and other processing aids were added. The mixture was dehydrated at 85° C. in vacuo, 1-2 mm Hg, for two hours after which time period 200 g. increments were weighed out and placed in a 90° C. oven prior to mixing with the appropriate isocyanate.

A. Diphenylmethane diisocyanate

Diphenylmethane diisocyanate, MDI, 30.66 g., 0.123 mole, was weighed out and maintained at 90° C. prior to mixing. To prepare the thermoplastic polyurethane stannous octoate, 0.026 g., was added to the polyol and mixed. The MDI was then added and the mixture rapidly stirred until it thickens (14-18 sec) at which point it is then poured into a Teflon ® (a trademark of DuPont Corporation) coated pan and allowed to cure. After curing the elastomer is granulated, dried at 100° C. and 0.3 mm Hg for 14-18 hrs. The dried polymer is melt processed on a ¾" single screw extruder at 28 rpm and melt profile 155-160° C. The extrudate is granulated, dried at 100° C. and 0.3 mm Hg for 14-18 hrs. and compression molded at 350° F. Specimens for tensile, die C and split tear were die cut from the molded plaques after standing 5 days at ambient temperature.

An elastomer of 43 Shore A hardness and 405 psi tensile strength is obtained.

Test results: See IVA in Table 3.

B. Methylene bis(4-cyclohexylisocyanate)

Methylene bis(4-cyclohexylisocyanate), $H_{12}$MDI, 31.52 g., 0.120 mole, was weighed out and maintained at 90° C. prior to mixing. To prepare the thermoplastic polyurethane stannous octoate, 0.140 g., was added to the polyol and mixed. The $H_{12}$MDI was then added and the mixture rapidly stirred until it thickens (40-45 sec) at which point it is then poured into a Teflon ® coated pan and allowed to cure. After curing the elastomer is granulated, dried at 100° C. and 0.3 mm Hg for 14-18 hrs. The dried polymer is melt processed on a ¾" single screw extruder at 30 rpm and melt profile 150-155° C. The extrudate is granulated, dried at 100° C. and 0.3 mm Hg for 14-18 hrs. and compression molded at 300° F. Specimens for tensile, die C and split tear were die cut from the molded plaques after standing 5 days at ambient temperature.

An elastomer of 50 Shore A hardness and 585 psi tensile strength is obtained.

Test results: See IVB in Table 3.

What is unique about the thermoplastic polyurethane of example IVA and IVB is that conventional technology cannot produce polyols of this MW without having very high levels of unsaturation, therefore its TPUs would be unobtainable.

V. PREPARATION OF A THERMOPLASTIC POLYURETHANE FROM A LOW UNSATURATION CONTAINING HIGH MOLECULAR WEIGHT POLYOL (OH# 9.9, MW 11333)

In a preparation similar to 1. above a polyol was prepared where analysis showed that the material contained 10.3% ethylene oxide, 89.7% primary OH and had an OH # of 9.9 mg KOH/g. The unsaturation value was 0.018 meq/g. and the KOH residue was 7.48 ppm.

A 500 ml resin flask was charged with 559.90 g., 0.0494 moles, of the polyol. In addition, 1,4-butanediol, 37.86 g., 0.4207 mole, and less than 1 wt % of a mixture of phenolic antioxidant, ester mold release and other processing aids were added. The mixture was dehydrated at 85° C. in vacuo, 1-2 mm Hg, for two hours after which time period 290 g. increments were weighed out and placed in a 90° C. oven prior to mixing with the isocyanate.

A. Diphenylmethane Diisocyanate

Diphenylmethane diisocyanate, MDI, 58.22 g., 0.228 mole, increments were weighed out and maintained at 90° C. prior to mixing. To prepare the thermoplastic polyurethane stannous octoate, 0.040-0.66 g. were added to the polyol samples and mixed. The MDI was then added and the mixture rapidly stirred until it thickens (11-15 sec) at which point it is then poured into a Teflon ® coated pan and allowed to cure. On curing it was noted that some unreacted polyol mixture was still on the bottom of the mixing beaker. Also gummy areas were noted on different parts of the casting. The relatively high KOH content of the polyol caused an unbalanced reaction to occur. The product from this reaction was not worked on further.

A 2000 ml resin flask was charged with 1100.0 g., 0.0971 moles, of the polyol. The polyol was treated with 2,904 g. of a 0.5 wt % 85% $H_3PO_4$ solution in PG 55–56, a 2000 MW polyol. In addition 0.55 g., 0.05 wt % of triphenyl phosphite was added and the mixture vacuum dried at 110° C. and 0.2mm of Hg for two hours.

A 2000 ml resin flask was charged with 900 g., 0.079 moles, of the above KOH adjusted polyol. In addition, 1,4-butanediol, 60.88 g., 0.676 mole, and less than 1 wt% of a mixture of phenolic antioxidant, amide mole release and other processing aids were added. The mixture was dehydrated at 85° C. in vacuo, 1–2 mm Hg, for two hours after which time period 300 g. increments were weighed out and placed in a 90° C. oven prior to mixing with the appropriate isocyanate.

Diphenylmethane diisocyanate, MDI, 60.16 9., 0.233 mole, was weighed out and maintained at 90° C. prior to mixing. To prepare the thermoplastic polyurethane stannous octoate, 0.063 g., was added to the polyol and mixed. The MDI was then added and the mixture rapidly stirred until it thickens (15–20 sec) at which point it is then poured into a Teflon ® coated pan and allowed to cure. After curing the elastomer is granulated, dried at 100° C. and 0.3 mm Hg for 14–18 hrs. The dried polymer is melt processed on a ¾" single screw extruder at 31 rpm and melt profile 200–213° C. The extrudate is granulated, dried at 100° C. and 0.3 mm Hg for 14–18 hrs. and compression molded at 390° F. Specimens for tensile, die C and split tear were die cut from the molded plaques after standing 5 days at ambient temperature.

An elastomer of 47 Shore A hardness and 464 psi tensile strength is obtained.

Test results: See VA. in Table 3.

B. Methylene bis(4-cyclohexylisocyanate)

A 500 ml resin flask was charged with 647.12 g., 0.0571 moles, of the polyol. In addition, 1,4-butanediol, 42.29 g., 0.4699 mole, and less than 1 wt % of a mixture of phenolic antioxidant, ester mold release and other processing aids were added. The mixture was dehydrated at 85° C. in vacuo, 1–2 mm Hg, for two hours after which time period two 287.5 g. increments were weighed out and placed in a 90° C. over prior to mixing with the isocyanate.

Two batches of methylene bis(4-cyclohexylisocyanate), $H_{12}MDI$, 57.64 g., 0.2197 mole were weighed out and maintained at 90° C. prior to mixing. To prepare the thermoplastic polyurethane stannous octoate, 0.168 to 0.252 g., was added to the polyol and mixed. The $H_{12}MDI$ was then added and the mixture rapidly stirred until it thickens (30–60 sec) at which point it is then poured into a Teflon ® coated pan and allowed to cure. After curing the elastomer is granulated, dried at 100° C. and 0.3 mm Hg for 14–18 hrs. The dried polymer is melt processed on a ¾" single screw extruder at 30 rpm and melt profile 155–162° C. The extrudate is granulated, dried at 100° C. and 0.3 mm Hg for 14–18 hrs. and compression molded at 300° F. Specimens for tensile, die C and split tear were die cut from the molded plaques after standing 5 days at ambient temperature.

An elastomer of 49 Shore A hardness and 573 psi tensile strength is obtained.

Test results: See VB. in Table 3.

As with the thermoplastic polyurethane of examples IVA and IVB those of this example are unique for the same reason, only more so, the high MW polyol and cannot be obtained by conventional technology therefore the TPUs would be unobtainable.

TABLE 1

| Polyol | POLYOL PROPERTIES | | | | |
|---|---|---|---|---|---|
| | MW | Unsat. | PPM KOH | % EO | % Primary |
| Polyol A | 3965 | 0.015 | 2.66 | 23.0 | — |
| Polyol B | 4050 | 0.0615 | 7.76 | 21.0 | 82.0 |
| Polyol C | 7010 | 0.0175 | 2.80 | 9.0 | 70.1 |
| Polyol D | 11333 | 0.018 | 7.48 | 7.0 | 78.0 |

TABLE 3

THERMOPLASTIC POLYURETHANES FROM HIGH MOLECULAR WEIGHT POLYOLS
Soft TPUs

| Example | Polyol | OH # | MW | Isocynate | Chain Extend. | Ultimate Tensile (psi) | Ultimate Elong. (%) | Split Tear (lb/in) | Die C Tear (lb/in) | Hardness |
|---|---|---|---|---|---|---|---|---|---|---|
| IV A | C | 16.00 | 7010 | MDI | BD | 405.0 | 440.0 | 17.2 | 73.9 | 43 A |
| IV B | C | 16.00 | 7010 | $H_{12}MDI$ | BD | 585.0 | 420.0 | 50.6 | 150.8 | 50 A |
| V A | D** | 9.90 | 11333 | MDI | BD | 464.0 | 280.0 | 16.3 | 78.2 | 47 A |
| V B | D | 9.90 | 11333 | $H_{12}MDI$ | BD | 573.0 | 472.0 | 51.2 | 152.7 | 49 A |

**Adjusted for KOH residue.

TABLE 2

THERMOPLASTIC POLYURETHANES FROM HIGH MOLECULAR WEIGHT POLYOLS
Effect of Unsaturation

| Example | Polyol | OH # | MW | Isocynate | Chain Extend. | Ultimate Tensile (psi) | Ultimate Elong. (%) | Split Tear (lb/in) | Die C Tear (lb/in) | Hardness |
|---|---|---|---|---|---|---|---|---|---|---|
| II A | A | 28.30 | 3965 | MDI | BD | 2375.0 | 1044.0 | 80.0 | 384.1 | 69 A |
| III A | B | 27.70 | 4050 | MDI | BD | 512.0 | 218.0 | 25.6 | 100.7 | 59 A |
| III B | B** | 27.70 | 4050 | MDI | BD | 691.0 | 358.0 | 39.3 | 165.9 | 62 A |
| | | | | | | 484.0 | 196.0 | 29.5 | 121.5 | |
| II B | A | 28.30 | 3965 | $H_{12}MDI$ | BD | 1146.0 | 879.0 | 114.0 | 353.8 | 66 A |

TABLE 2-continued

THERMOPLASTIC POLYURETHANES FROM
HIGH MOLECULAR WEIGHT POLYOLS
Effect of Unsaturation

| Example | Polyol | OH # | MW | Isocyanate | Chain Extend. | Ultimate Tensile (psi) | Ultimate Elong. (%) | Split Tear (lb/in) | Die C Tear (lb/in) | Hardness |
|---|---|---|---|---|---|---|---|---|---|---|
| III C | B | 27.70 | 4050 | $H_{12}MDI$ | BD | 715.0 | 280.0 | 61.2 | 189.0 | 65 A |

**Adjusted for KOH residue by neutralization with phosphoric acid.

What is claimed is:

1. A thermoplastic polyurethane or polyurea elastomer made by reacting in a "one-shot" process a polyether diol, a diisocyanate, and a difunctional, isocyanato-reactive chain-extender, the polyether diol being prepared utilizing a double metal cyanide complex catalyst and having a molecular weight of between about 2000 and about 20,000, said diol having an end group unsaturation level of no greater than 0.04 milliequivalents per gram of diol, the equivalent ratio of NCO groups on said diisocyanate to active hydrogen groups on said diol plus chain extender being between about 1:0.7 and about 1:1.3, and the molar ratio of chain extender to diol being between about 0.15:1 and about 75:1.

2. The elastomer of claim 1 wherein said chain extender is selected from the group consisting of diols, diamines, and combinations thereof.

3. The elastomer of claim 1 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

4. The elastomer of claim 1 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

5. The elastomer of claim 1 wherein said diol has a molecular weight of between 4,000 and 10,000.

6. The elastomer of claim 1 wherein said diol has an ethylene oxide content of less than 35 weight percent if the molecular weight of said polyol is less than 4,000.

7. A thermoplastic polyurethane or polyurea elastomer made by reacting an isocyanate-terminated prepolymer with a difunctional isocyanato-reactive chain-extender, the isocyanate-terminated prepolymer being the reaction product of a polyisocyanate and a polyether diol prepared utilizing a double metal cyanide complex catalyst and having a molecular weight of between about 2000 and about 20,000, said diol having an end group unsaturation level of no greater than 0.04 milliequivalents per gram of diol the equivalent ratio of NCO groups on said diisocyanate to active hydrogen groups on said diol plus chain extender being between about 1:0.7 and about 1:1.3, and the molar ratio of chain extender to diol being between about 0.15:1 and about 75:1.

8. The elastomer of claim 7 wherein said chain extender is selected from the group consisting of diols, diamines, and combinations thereof.

9. The elastomer of claim 7 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

10. The elastomer of claim 7 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

11. The elastomer of claim 7 wherein said diol has a molecular weight of between 4,000 and 10,000.

12. The elastomer of claim 7 wherein said polyol has an ethylene oxide content of less than 35 weight percent if the molecular weight of said polyol is less than 4,000.

13. A method of fabricating a thermoplastic elastomer which comprises the steps of:
  (a) fabricating a diol having a molecular weight of between about 2,000 and about 20,000 and having a level of end group unsaturation of no greater than 0.04 milliequivalents per gram of diol, said polyol being fabricated in the presence of a double metal cyanide catalyst, (b) reacting said diol with a diisocyanate to produce an isocyanate-terminated prepolymer, and
  (c) reacting said isocyanate-terminated prepolymer with a difunctional isocyanato-reactive chain extender in a mold or in an extruder in order to produce a soft elastomer characterized by a Shore A hardness of between about 10 and about 70, with the proviso that when the molecular weight of the diol is less than 4,000, then the polyol has an ethylene oxide content of less than 35 weight based upon the weight of the diol.

14. The method of claim 13 wherein said chain extender is selected from the group consisting of diols, diamines, and combinations thereof.

15. The method of claim 13 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

16. The method of claim 13 wherein said diol has a molecular weight of between 4,000 and 12,000.

17. The method of claim 13 which additionally contains at least one compounding ingredient selected from the group consisting of anti-oxidants, plasticizers, uv stabilizers, adhesion promoters, fillers and pigments.

18. The method of claim 17 wherein said compounding ingredient is employed in an amount of between 0 and about 75 weight percent based upon the total weight of the composition.

19. The method of claim 13 wherein steps (b) and (c) are conducted simultaneously.

20. The method of claim 13 wherein said Shore A hardness is between about 40 and about 60.

* * * * *

UNITED STATES PATENT AND TRADEMARK OFFICE
CERTIFICATE OF CORRECTION

PATENT NO. : 5,096,993

DATED      : March 17, 1992

INVENTOR(S) : Curtis P. Smith et al.

It is certified that error appears in the above-identified patent and that said Letters Patent is hereby corrected as shown below:

In column 14, at line 36 after "said" delete "polyol" and insert --diol--.

Signed and Sealed this

Sixth Day of July, 1993

Attest:

MICHAEL K. KIRK

Attesting Officer

Acting Commissioner of Patents and Trademarks